United States Patent
Nulman et al.

(10) Patent No.: US 7,891,917 B2
(45) Date of Patent: Feb. 22, 2011

(54) AUTOMATIC BRAKE SHOE DRILLING MACHINE AND METHOD

(76) Inventors: Gregory Nulman, 796 Bob White La., Huntingdon Valley, PA (US) 19006; August Eskler, 17 Walton Ct., Newtown, PA (US) 18940

( * ) Notice: Subject to any disclaimer, the term of this patent is extended or adjusted under 35 U.S.C. 154(b) by 555 days.

(21) Appl. No.: 11/730,185

(22) Filed: Mar. 29, 2007

(65) Prior Publication Data
US 2007/0292221 A1    Dec. 20, 2007

Related U.S. Application Data

(60) Provisional application No. 60/787,224, filed on Mar. 30, 2006.

(51) Int. Cl.
*B23B 35/00*   (2006.01)
*B23B 41/00*   (2006.01)

(52) U.S. Cl. .............. 408/1 R; 408/53; 408/3; 408/71

(58) Field of Classification Search .......... 408/1 R, 408/42, 43, 53, 67, 3, 69, 71
See application file for complete search history.

(56) References Cited

U.S. PATENT DOCUMENTS

| | | | | |
|---|---|---|---|---|
| 26,778 | A * | 1/1860 | Mitchell | 408/37 |
| 646,647 | A * | 4/1900 | MacCordy | 408/43 |
| 1,970,018 | A * | 8/1934 | Poole | 408/43 |
| 2,013,420 | A * | 9/1935 | Opel | 408/13 |
| 2,934,978 | A * | 5/1960 | Estabrook | 408/13 |
| 3,336,823 | A * | 8/1967 | Bonzi | 408/71 |
| 3,513,730 | A * | 5/1970 | Lohneis | 408/241 R |
| 3,833,312 | A * | 9/1974 | Miles et al. | 408/42 |
| 3,841,199 | A * | 10/1974 | Jepson et al. | 409/80 |
| 3,841,782 | A * | 10/1974 | Mengeringhausen | 408/50 |
| 6,254,318 | B1 * | 7/2001 | Sica | 408/39 |
| 6,494,649 | B2 * | 12/2002 | Queipo | 408/27 |
| 6,857,828 | B2 * | 2/2005 | Weber et al. | 408/1 R |

FOREIGN PATENT DOCUMENTS

| | | | |
|---|---|---|---|
| RU | 1814591 | A3 * | 5/1993 |
| SU | 1542780 | A1 * | 2/1990 |
| SU | 1703287 | A1 * | 1/1992 |

OTHER PUBLICATIONS

Translation of Soviet 1,542,780, translated Jun. 2010 by PTO translators.*
Translation of Soviet 1,703,287, translated Jun. 2010, by PTO translators.*
Clear Soviet 1,703,287, already of record.*

* cited by examiner

*Primary Examiner*—Daniel W Howell
(74) *Attorney, Agent, or Firm*—Roylance, Abrams, Berdo & Goodman, LLP

(57) ABSTRACT

Apparatus and method are provided for automatically drilling work pieces, including drilling of rivet holes in standard and heavy-duty brake shoe linings for the truck, bus, overhead crane, wheel drum and heavy machinery industries. Apparatus and method are customizable to accommodate various sizes of work pieces, and programmable for drilling of multiple holes and handling of multiple work pieces, as required by manufacturers.

15 Claims, 6 Drawing Sheets

AUTOMATIC BRAKE SHOE DRILLING MACHINE AND METHOD

CROSS-REFERENCE TO RELATED APPLICATIONS

The present application claims priority under 35 U.S.C. §119 (e) to U.S. provisional patent application Ser. No. 60/787,224 filed Mar. 30, 2006, the entire content of which is expressly incorporated herein by reference.

BACKGROUND OF THE INVENTION

1. Field of the Invention

The present invention is in the field of brake lining and brake friction material industry. In particular, the present invention provides a method and an apparatus for drilling of brake show lining.

2. Description of the Related Art

The first drilling machine for the brake shoe lining industry was developed in the early 1980s in the former Soviet Union. A need was met when this prototype machine was created; for the whole concept was to increase drilling productivity over slower manual drilling for brake shoe lining drilling. One of the first successful prototypes for a brake shoe lining drilling machine was created for a Russian friction material company. The machine functioned with great success. The prototype is described in detail in a certificate for invention No. SU 1542780, filed in the former Soviet Union on Oct. 6, 1987, the entire disclosure of which is hereby incorporated by reference.

While the original design as described in SU 1542780 was successful, several drawbacks did exist, such as inability to easily drill different linings, lack of drilling precision, and complicated and inflexible design. Thus, there was a needed for a brake lining drilling machine and method which would provide a more flexible design and higher drilling accuracy.

SUMMARY OF THE INVENTION

The present invention provides a method and an apparatus to address at least the drawbacks noted above.

According to an exemplary embodiment of the present invention, there is provided a brake shoe lining drilling machine comprising a rotating wheel station, which holds the brake shoe liners through the loading, drilling (bore), and depositing process.

In an exemplary implementation, approximately 34 drilled brake shoes can be produced in an hour by the brake shoe lining drilling machine according to an exemplary embodiment of the present invention.

According to exemplary embodiments of the present invention an apparatus and method are provided for automatically drilling rivet holes in standard and heavy-duty brake shoe linings (brake blocks) for the truck, bus, overhead crane, wheel drum and heavy machinery industries.

In an exemplary implementation, a brake shoe lining drilling machine according to embodiments of the present invention can be customized for the unique needs of each friction material manufacturer and the specific brake liners they use. As will be understood by skilled artisans, while the brake shoe lining drilling machine according to exemplary embodiments of the present invention is a customizable machine, the machine can also have a general purpose, function, and construction.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF EXEMPLARY EMBODIMENTS

Standard and heavy-duty brake shoe liners (also called "Brake Blocks") come in many sizes and multiple thicknesses, but generally the same curved shape. The size and curved diameter of the brake shoe liner vary as many types of heavy-duty liners are in the market. A typical size for a heavy-duty brake shoe liner would be (approximately) 2"-9" wide× 4"-12" long×up to 1" thick with 9"-26" diameter curve. Liner weight is approximately up to 10 lbs. A drilling machine according to an exemplary embodiment of the present invention can be customized to fit the design specifications of the manufacturer. A limit for the width size can be set in place through research and development. Weight restrictions can bet set on the entire amount of brake shoe liners stacked in the process rack. The restriction can be assessed through the type of liner used and the specifics applied to each customized drilling machine according to an exemplary embodiment of the present invention. Depending on a limited weight, the amount stacked can be closely considered with each drilling machine configured according to exemplary embodiments of the present invention.

Heavy-duty brake shoe liners, and some types of standard brake shoe liners, are riveted onto the brake shoe. In some applications, brake shoe liners are attached to the brake shoe by adhesive application. However, for a stronger application of the brake shoe liner to the brake shoe, rivets will be needed; thus the need for rivet holes drilled in liners is needed. Conventionally, brake shoe liners are drilled manually in a costly and time-consuming manner. A drilling machine according to an exemplary embodiment of the present invention can reduce the cost and time consumption.

Brake shoe liner rivet holes (counter bores), as well as the carbon based drill bits with Adjustable-Diameter Counter bores, will vary in size and will solely depend on the specific needs of the brake liner manufacturer. A drilling machine according to an exemplary embodiment of the present invention can perform multiple size drilling holes by the simplified changing of multiple size drill bits. Multiple drill spindles will be used for multiple drilling simultaneously. Exemplary implementations of a Drilling Unit in a drilling machine according to an exemplary embodiment of the present invention will be described below.

If manufacturer has the need of drilling multiple types of brake shoe liners, (such as liner with 9", 12" diameter, 14" diameter, 16" diameter) multiple drum wheels (Rotating Wheel Assy.) will be made available to provide for the different size applications.

Figure 1:
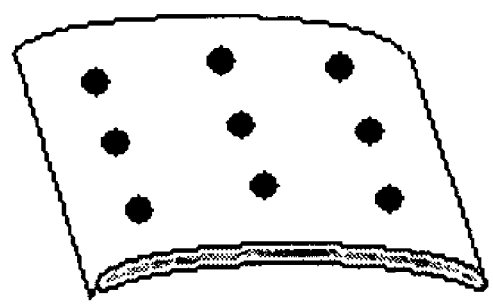
FIG. 1: illustrates various conventional break linings which may be processed in accordance with exemplary embodiments of the present invention.
Figure 1:
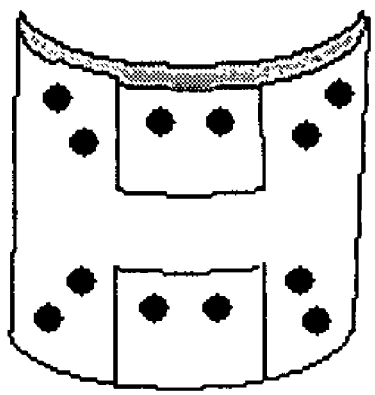
Figure 1:
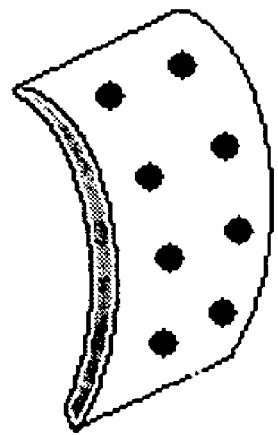
Figure 1:
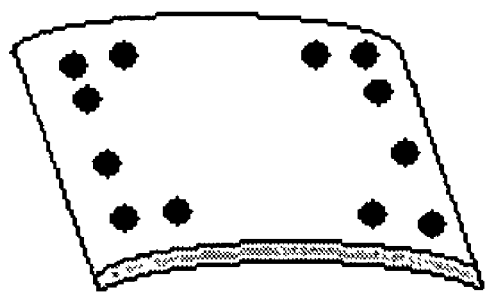

Brake shoe liners are made from flexible, solid woven, asbestos free friction based material. However, the materials used to make brake shoe liners may vary per manufacturer in quality and chemical composition. A drilling machine according to an exemplary embodiment of the present invention is built to accommodate the drilling requirements of mostly all types of brake shoe liners, examples of which are illustrated in FIG. 1 where multiple variations of brake liners with their unique individual rivet hole patterns, sizes, thicknesses, weights, and curvature diameters are shown.

As noted above, a typical size for a heavy-duty brake shoe liner would be (approximately) 2" to 9" wide×4"-12" long×up to 1" thick with 9"-26" diameter curve. Liner weight is approximately up to 10 lbs. Counter bored holes have different locations, patterns, and diameters. All of these drilling factors are taken into account when the engineering of the customized drilling machine according to an exemplary embodiment of the present invention takes place.

Figure 2:
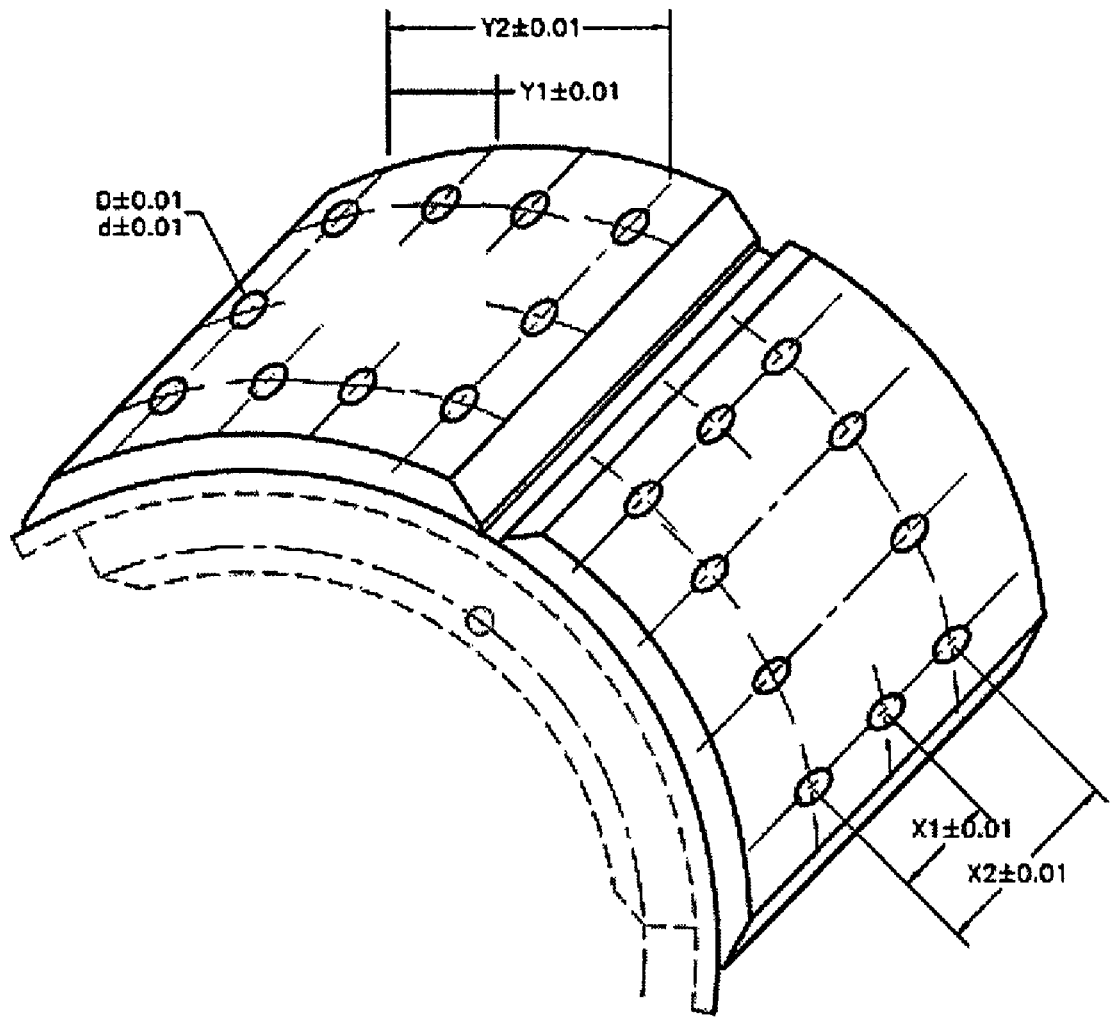
FIG. 2: illustrates tolerances for break shoe liners which may be achieved in accordance with exemplary embodiments of the present invention.

Dimensions counter bore to counter bore vary. However, the tolerance between counter bore to counter bore, and the counter bore itself, needs to comply with standard manufacturer specifications. Tolerances for brake shoe liners are illustrated in FIG. 2. While the tolerances are subject to change depending on manufacturers' specifications, a drilling machine according to an exemplary embodiment of the present invention can accommodate such changes.

A drilling machine according to an exemplary embodiment of the present invention is designed to, for example, target the drilling needs and demands of the brake shoe liner manufacturer/friction material industry. The benefit include total customization of the drilling machine according to an exemplary embodiment of the present invention around the design requirements of the brake shoe liner.

Next, a method for drilling shoe liners according to an exemplary embodiment of the present invention will be described in the context of a drilling machine according to an exemplary embodiment of the present invention.

Figure 3:
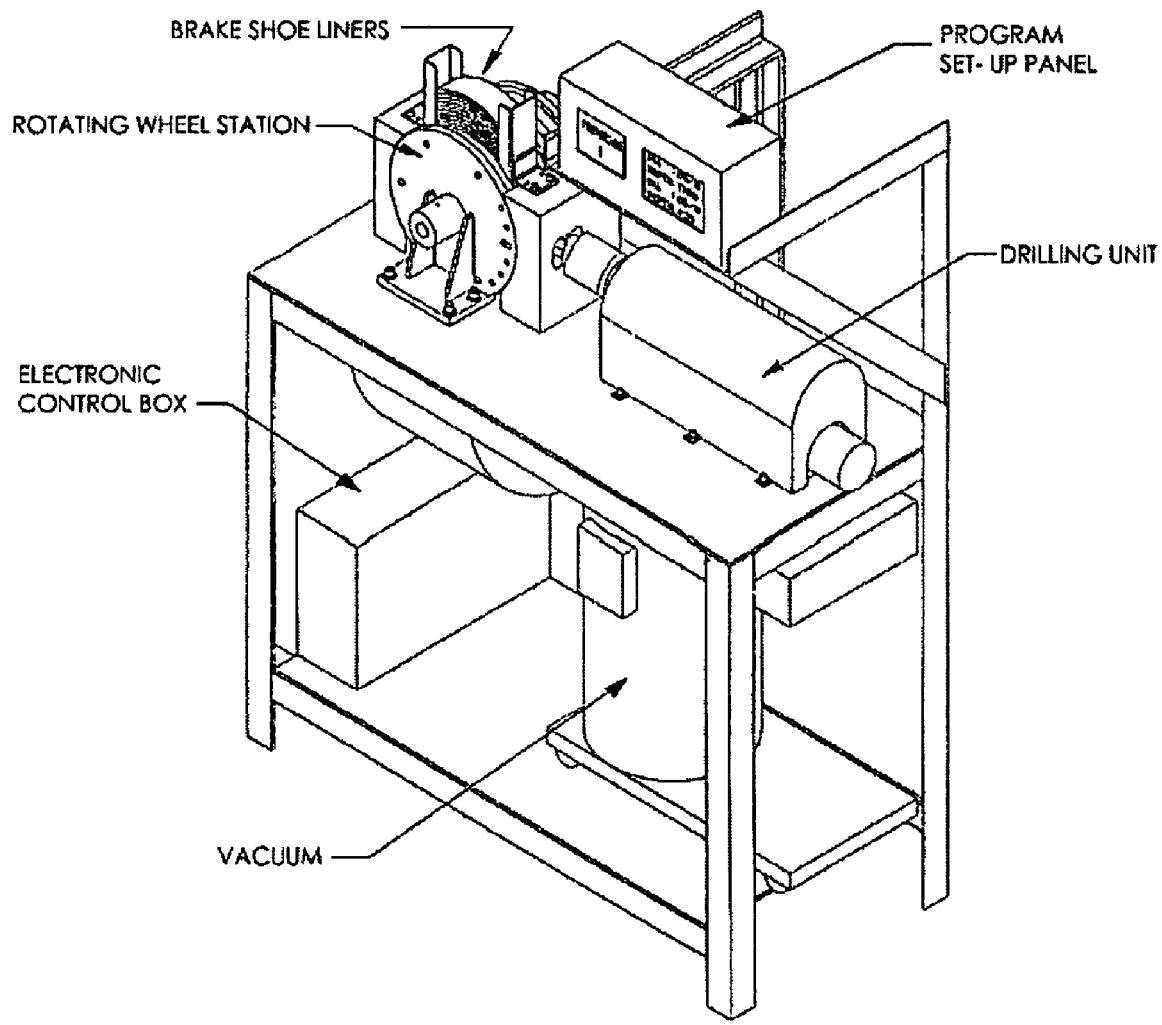
FIG. 3: illustrated a general layout of a drilling machine according to an exemplary embodiment of the present invention.

A drilling machine according to an exemplary embodiment of the present invention comprises six main assemblies as shown in FIG. 3 without covers on a table frame. These parts include, but are not limited to: Table Frame, Rotating Wheel Station, Drilling Unit, Program Set-Up Panel, Electronic Control Box, and the Vacuum.

The Table Frame is its foundational structure. It will be welded together with angle iron, riveted onto the angle iron with sheet metal covers, and will have a sheet metal door to access assemblies and parts within the structure. It is noted that the Covers are not shown in FIG. 3 so as not to obscure some of the features of the exemplary implementation illustrated therein.

The Rotating Wheel Station/Assembly is an entire assembly consisting of the main feature, the Rotating Wheel. This wheel will be responsible for rotating the liners from the storage rack, to the drilling presets, and to the deposit bin. The wheel will have adjusting holding pins to secure and position the exact coordinates for the liner to be drilled. Sensors sent by commands from the Set-Up Panel will activate rotation of the wheel. The assembly also comprises holding brackets, storage rack, and motor.

The Drilling Unit Assembly is an assembly that performs the actual drilling of the brake liner. This assembly has a drilling shaft, multiple drilling spindles (2-4 Spindle Drill Head), a motor to spin the shaft, and an actuator to move the whole Drilling Unit into drilling position. Most of the Drilling Unit mechanisms can have safety covering.

The Program Set-Up Panel is the main controller to operate a drilling machine according to an exemplary embodiment of the present invention. Through this touch screen panel, set-up procedures can be programmed in. It will also display current activity of the drilling process. A skilled artisan will readily appreciate that other methods of control and display of information may be implemented without departing from the teaching of the present invention.

The Electronic Control Box is the sorted electrical distribution center. Through this junction box, all the electric powered systems operate for the drilling machine according to an exemplary embodiment of the present invention. It can wire into the Program Set-Up Panel, Drilling Unit, and Rotating Wheel Station.

The Vacuum is an exemplary implementation which can make a drilling machine according to an exemplary embodiment of the present invention an environmentally safe machine to use as it will remove the drilling particles and dust during the drilling process.

Figure 5:
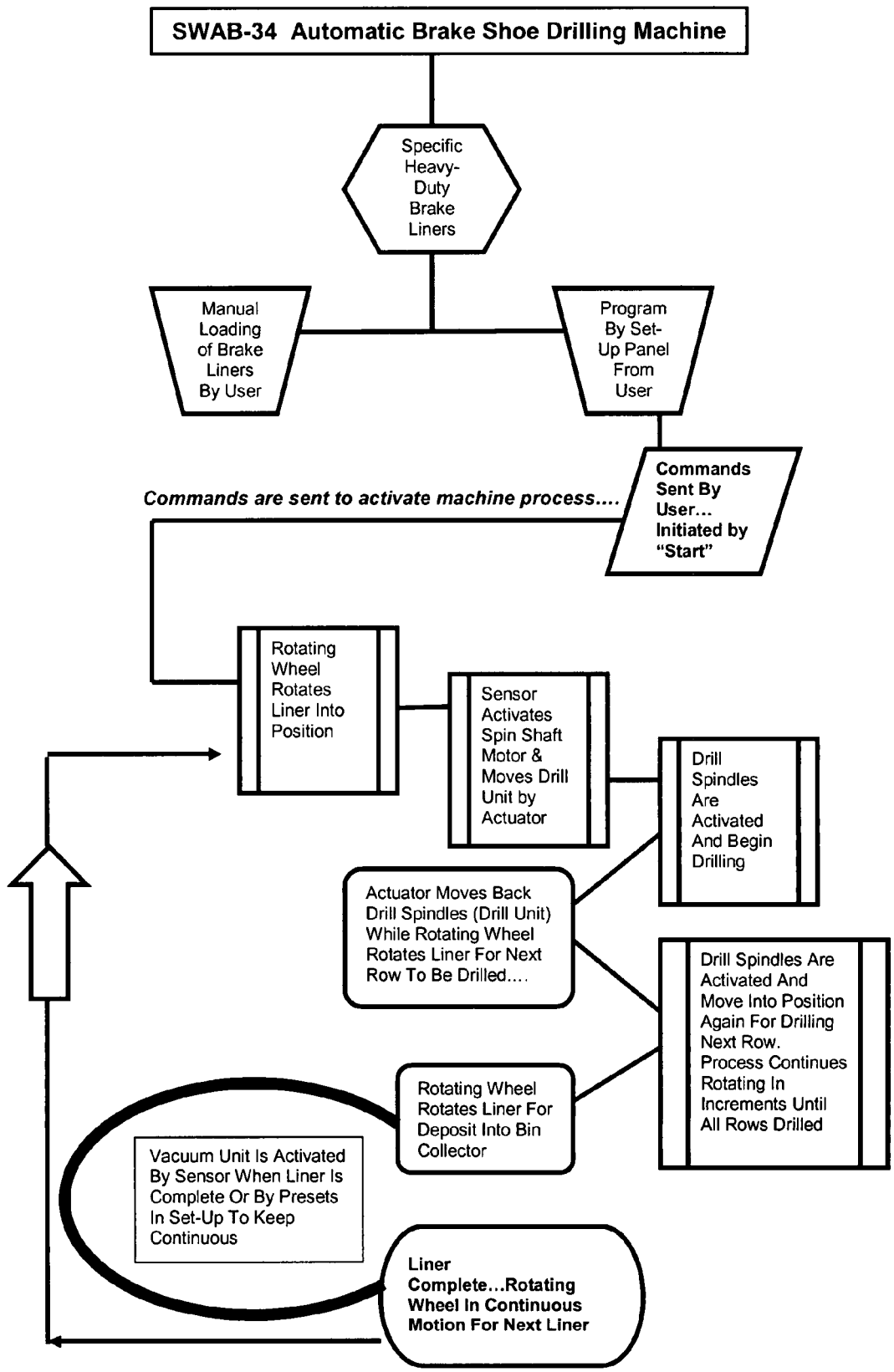
FIG. 5: is a flowchart showing method steps of a drilling operation according to an exemplary embodiment of the present invention.

An example of a process of drilling break show liners using a drilling machine according to an exemplary embodiment of the present invention is described below and shown in a flowchart of FIG. 5.

The process begins as brake shoe liners are manually loaded into the storage rack by user.

The Set-Up Panel will then need to be programmed by the user to set up the precise inputs for the specialized drilling task. Once programmed, the user will activate the start feature manually (located on the Set-Up Panel touch-screen).

The holding pins hold the brake liner on the Rotating Wheel, which rotates clockwise by sensor. Once a brake liner has rotated on the Rotating Wheel another sensor will activate the actuator in the Drilling Unit to move the entire unit into position for drilling.

Figure 4:
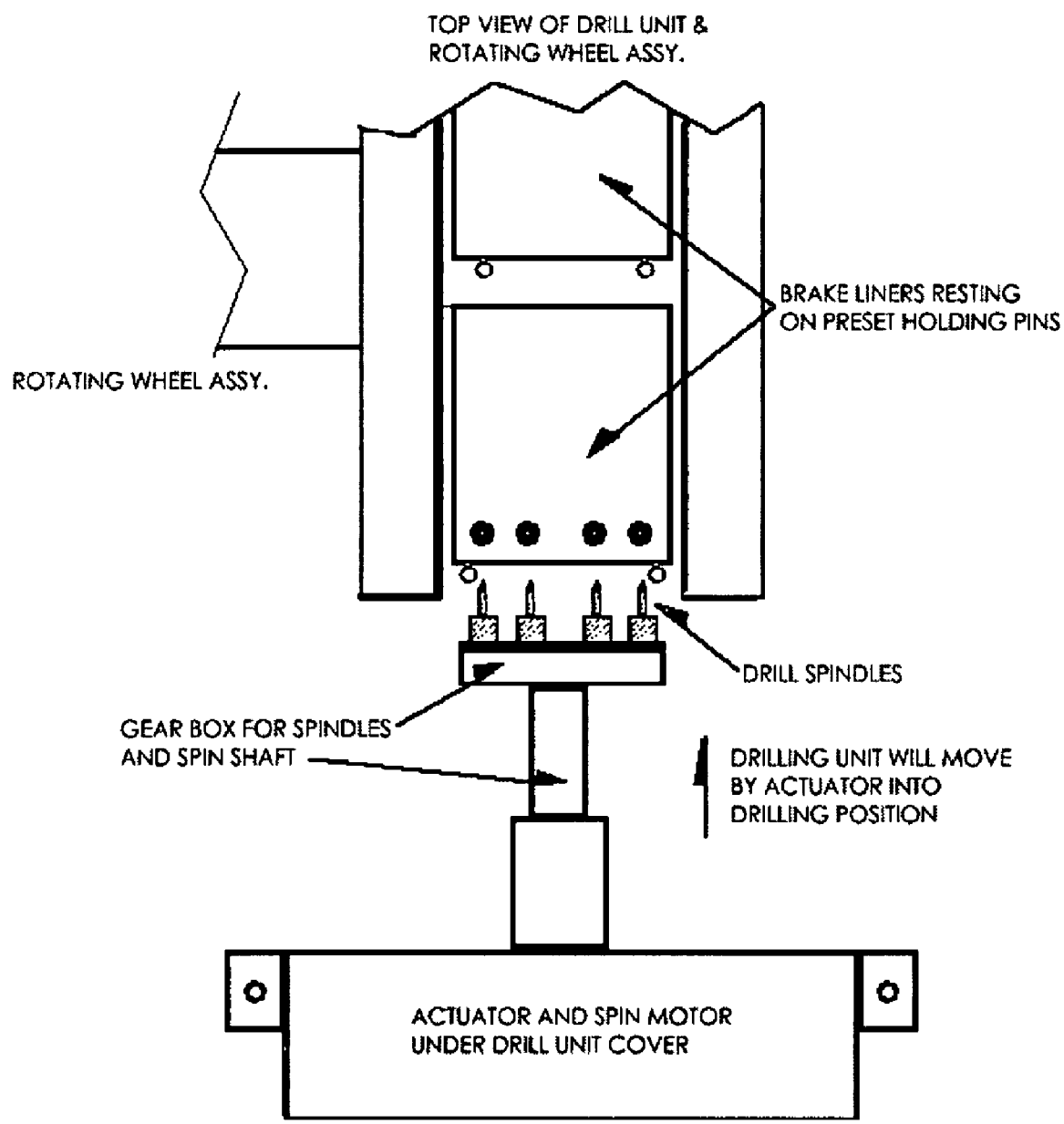
FIG. 4: illustrates a detail of the dill unit and rotating wheel assembly according to an exemplary embodiment of the present invention.

At time of the Drill Unit positioning, sensors will activate the motor for the spin shaft. The action of the spin shaft will activate the gearbox to spin the individual drill spindles for drilling. The automated drilling process begins as rivet holes (counter bores) are drilled into the brake liner while locked into position by specific custom presets, as shown, for example, in FIG. 4.

Sensors again will activate the Rotating Wheel to rotate the brake shoe liner for another row of drilling. Set-Up Panel presets rows in increments.

After drilling, the brake liner will rotate again on the wheel by sensor to be deposited into the collection bin (located under the Rotating Wheel assembly on the underside of table). During this part of the process, the vacuum will remove the drill dust and fragments. Once a brake liner moves into the collection bin, another brake liner immediately begins the drilling process. Brake liners are in continual process.

Figure 6:
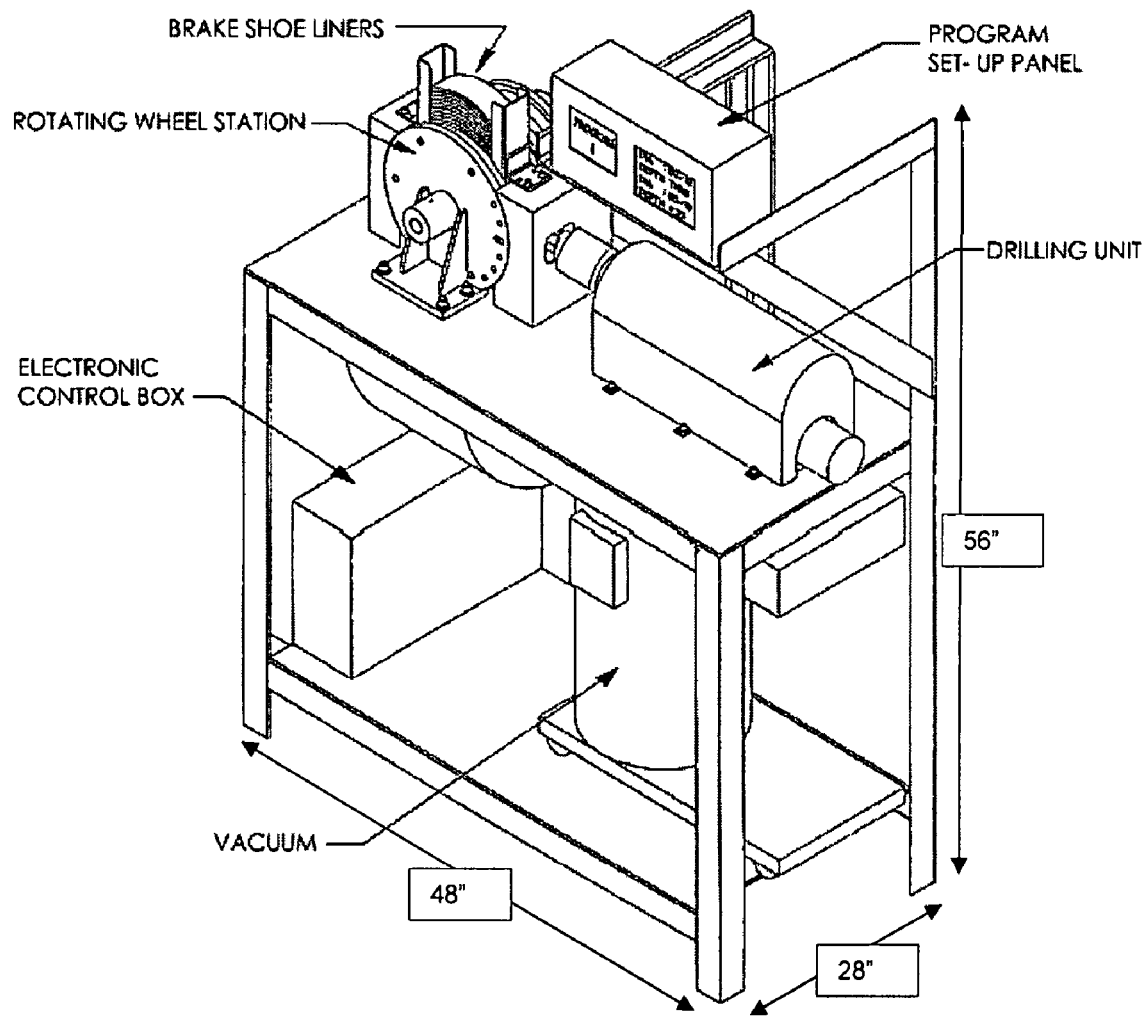
FIG. 6: illustrated a general layout with exemplary dimensions of a drilling machine according to an exemplary embodiment of the present invention.

FIG. 6 shows an example of the dimensions of a drilling machine according to an exemplary embodiment of the present invention which include Length is at 48 inches, Width is at 28 inches, Height is at 56 inches and Overall Weight of approximately 200 lbs (calculated without liner weight). Electric Motor Specifications according to an exemplary implementation are: 5 HP/120-750 RPM; 115 Volts; 60 Hz; 1 Phase.

Exemplary improvements and advantages which can be achieved by exemplary implementations of the method and apparatus according to the embodiments of the present invention are described below.

One of the main dangers in industry today is the environmental and atmospheric hazards within the manufacturing and fabrication areas. One of the most common dangers is the air that is breathed. The brake shoe lining industry does not escape this concern. Cutting, finishing, and drilling of brake liners can leave unhealthy deposits in the air. The vacuum system to the drilling machine according to an exemplary embodiment of the present invention eliminates foreign particles and dust from the air as it removes those unhealthy particles at the very moment of drilling. The drilling machine according to an exemplary embodiment of the present invention is environmentally safe compared to conventional manual drilling of brake shoe liners.

With manual labor, the average time of drilling the required rivet holes for 1 brake block (brake shoe lining) is 4 minutes; this leaves approximately 15 brake blocks drilled per hour. On average, 120 brake blocks will be drilled in an 8-hour day, 600 per week, and 31,200 per year. A workingman receiving $12.00 hourly for an 8-hour working day receives $96.00 per day, $480.00 per week, and $24,960.00 per year in salary. With 15 brake blocks per hour at $12.00 per hour in salary results in a breakdown of 80 cents per brake block drilled.

With the automation of the method and apparatus afforded by exemplary embodiments of the present invention, the average time of manufacturing each brake block is 1.75 minutes leaving approximately 34 brake blocks made per hour. On average, 275 blocks will be completed in an 8-hour day, 1,375 per week, and 71,500 per year. Taking manual labor cost of 80 cents per brake block and multiplying it with the new SWAB-34 production amount of 275 brake blocks per 8-hour working day results in $220.00 in profit gained per 8-hour working day, $1100.00 per week, and $53,900.00 per year. Table 1 set forth below shows exemplary economic advantages which may be achieved by implementing the method and apparatus according to exemplary embodiments of the present invention.

TABLE 1

| STATISTICS | AMOUNT PER HOUR | AMOUNT PER WORKING DAY (BASED ON 8-HR DAY) | AMOUNT PER YEAR | PROFITS AND/OR EXPENSES |
|---|---|---|---|---|
| MANUAL LABOR | 15 BLOCKS | 120 BLOCKS | 31,200 BLOCKS | YEARLY EXPENSE $24,960.00 |
| SWAB-34 | 34 BLOCKS | 275 BLOCKS | 71,500 BLOCKS | PROFITS GAINED $53,900.00 |

In summary, the advantages afforded by the method and apparatus according to exemplary embodiments of the present invention include, but are not limited to the following:

Economic—Labor cost will be significantly reduced.
Productive—Profit gain through increased production.
Environmental—Percentages of atmospheric dust will be eliminated.
Accessibility—Easy storage rack to load brakes with shoe liners.
Easy Control—Program Set-Up Panel allows easy entry on a touch screen for programming.
Simplified Design—Allows quick solutions when changing or conversion of parts or assemblies takes place.
Uniqueness—One of a kind design.

These advantages are achieved by the method and apparatus according to exemplary embodiments of the present invention for at least due to the following, non-limiting, unique features.

A Rotary Table which rotates Working Drum with Linings for any needed angle by a divided electronic mechanism, which allows change to any degree for different linings. Thus the method and apparatus according to exemplary embodiments of the present invention can be used for any type of Lining with any different distance between group of holes. In addition, higher precisions that results in a higher quality can be achieved.

Working Drum has a simplified design which does not require it to move in a horizontal direction, only rotate by Rotary Table. The Drill Head with Multiple Spindle Mechanism move against Working Drum with Lining by liner motion control. This design provides high precision and accuracy for an improved quality.

A Drill Head which has mechanism for changing distance between drills facilitates greater accuracy and allows for use of a drill for different type of Linings.

An interchangeable Working Drum allows the same machine to be used for several different types of brake lining.

As will be appreciated by skilled artisans, the industry for friction materials has a wide national and international market with various methods of application. In light of this fact, one of the goals and purposes of the apparatus and method according to exemplary embodiments of the present invention is to offer the friction material industry a solution that will increase their production of drilling the necessary rivet holes in their brake shoe liners.

Although several embodiments of the present invention have been disclosed for illustrative purposes, those skilled in the art will appreciate that various modifications, additions and substitutions are possible, without departing from the scope of the invention. Accordingly, the present invention is not limited to the above-described embodiments.

We claim:

1. A drilling device comprising:
   a rotating wheel assembly for accommodating a work piece thereon, the work piece comprising a curved surface;
   a drilling unit movable relative to the work piece in a generally linear motion, and comprising a plurality of drilling spindles thereon;
   a controller for controlling the rotation of the wheel assembly and movement of the drilling unit to position the curved surface of the work piece with respect to the drilling spindles thereby facilitating drilling of the work piece through the curved surface by the drilling spindles at a plurality of locations on the work piece; and
   a stationary frame for accommodating the rotating wheel assembly and the drilling unit securely thereon,
   wherein:
   the rotating wheel assembly is not movable in the generally linear motion relative to the drilling unit and remains fixed with respect to the drilling unit at least during the drilling of the work piece,
   the rotating wheel assembly is a first wheel assembly removably attached to said stationary frame, said first wheel assembly accommodating a first work piece thereon; and
   said stationary frame interchangeably accommodates a second wheel assembly different from said first wheel assembly, said second wheel assembly accommodating a second work piece thereon different from said first work piece.

2. The drilling device of claim 1, wherein the rotating wheel assembly comprises an exterior surface for accommodating the work piece thereon, the exterior surface being essentially parallel to said curved surface of the work piece.

3. The drilling device of claim 1, further comprising a user interface for inputting at least one command to the controller.

4. The drilling device of claim 3, wherein the user interface comprises a display for displaying at least one of a status of the drilling and the at least one command.

5. The drilling device of claim 1, wherein the controller comprises a storage for storing at least one instruction for the drilling, the controller being programmable to execute a set of instructions for the drilling.

6. The drilling device of claim 3, wherein the user interface comprises at least one of a touch panel, a set of keys and a touch screen for inputting the at least one command.

7. The drilling device of claim 1, further comprising an electronic control unit for supplying power to the rotating wheel assembly, the drilling unit and the controller.

8. The drilling device of claim 1, further comprising a vacuum configured with respect to the rotating wheel assembly for removing particles or dust at least from an area proximate to the rotating wheel at least during the drilling of the work piece.

9. The drilling device of claim 1, wherein the work piece comprises a brake shoe liner.

10. The drilling device of claim 1, wherein the rotating wheel assembly is configured to accommodate a plurality of work pieces thereon.

11. The drilling device of claim 1, wherein the work piece is positioned with respect to the drilling spindles by a rotational movement of the rotating wheel assembly, and the drilling spindles are advanced with respect to the work piece in an essentially linear movement of the drilling unit with respect to the rotating wheel assembly.

12. A method for drilling a work piece, the method comprising:

positioning at least one work piece in a supporting assembly disposed with respect to a drilling unit comprising a plurality of drilling spindles, the at least one work piece comprising a curved surface;

rotating the supporting assembly to position a portion of the curved surface of the at least one work piece with respect to the drilling spindles;

linearly advancing the drilling unit toward the rotating support assembly;

drilling the work piece when the spindles are positioned on the portion of the curved surface of the work piece through the curved surface; and removably attaching the supporting assembly to a stationary frame before positioning the at least one work piece on the supporting assembly, wherein the supporting assembly remains fixed with respect to the drilling unit at least during the drilling of the work piece, and the stationary frame interchangeably accommodates a plurality of different supporting assemblies for accommodating different work pieces thereon respectively.

13. The method of claim 12, wherein the work piece comprises a brake shoe liner.

14. The method of claim 12, wherein the supporting assembly is configured to accommodate a plurality of work pieces thereon, the method further comprising:

positioning at least a second work piece in the supporting assembly; and rotating the supporting assembly to position a second portion of the second work piece with respect to the drilling spindles;

linearly advancing the drilling unit toward the rotating support assembly; and drilling the second work piece when the spindles are positioned on the second portion of the second work piece.

15. The method of claim 12, wherein the supporting assembly comprises a rotating wheel assembly comprising an exterior surface for accommodating the at least one work piece thereon, the exterior surface being essentially parallel to the curved surface of the at least one work piece.

* * * * *